US006640257B1

(12) United States Patent
MacFarlane

(10) Patent No.: US 6,640,257 B1
(45) Date of Patent: Oct. 28, 2003

(54) SYSTEM AND METHOD FOR AUDIO CONTROL

(75) Inventor: M. David MacFarlane, Jacksonville, TX (US)

(73) Assignee: Applied Electronics Technology, Inc., Jacksonville, TX (US)

( * ) Notice: Subject to any disclaimer, the term of this patent is extended or adjusted under 35 U.S.C. 154(b) by 0 days.

(21) Appl. No.: 09/439,937

(22) Filed: Nov. 12, 1999

(51) Int. Cl.[7] .................................................. G06F 3/00
(52) U.S. Cl. .................................. 710/1; 710/2; 84/609; 84/603; 84/625; 84/647; 84/604
(58) Field of Search ........................ 710/1, 2; 381/119; 84/609, 603, 604, 625, 647

(56) References Cited

U.S. PATENT DOCUMENTS

| | | | | |
|---|---|---|---|---|
| 5,309,517 A | | 5/1994 | Barclay ....................... 381/119 |
| 5,402,499 A | * | 3/1995 | Robison et al. ............. 381/119 |
| 5,585,583 A | * | 12/1996 | Owen ........................ 84/470 R |
| 5,630,175 A | | 5/1997 | Gajewski et al. ............ 395/892 |
| 5,752,082 A | | 5/1998 | Staples ....................... 395/882 |
| 5,792,971 A | * | 8/1998 | Timis et al. ................... 84/609 |
| 5,799,036 A | | 8/1998 | Staples ........................ 375/222 |
| 5,857,099 A | * | 1/1999 | Mitchell et al. ............. 704/235 |
| 5,969,654 A | * | 10/1999 | Goldin ........................ 341/141 |
| 6,236,212 B1 | * | 5/2001 | Wynn ........................... 324/365 |
| 6,353,169 B1 | * | 3/2002 | Juszkiewicz et al. .......... 84/600 |
| 6,416,482 B1 | * | 7/2002 | Braun et al. ................. 600/559 |
| 6,507,790 B1 | * | 1/2003 | Radomski ..................... 702/39 |

* cited by examiner

*Primary Examiner*—N. Patel
(74) *Attorney, Agent, or Firm*—Robin A. Brooks

(57) ABSTRACT

The present invention comprises a system that provides a convenient and easy-to-use means for controlling audio input and output for recording. The system includes a first input adapted to receive a high fidelity microphone such as a low impedance microphone, and a second input adapted to receive a musical instrument. The system also includes at least two outputs, each adapted to transmit analog signals to an input of a sound card (30) of a computer (20), and electrical circuitry coupling the inputs to the outputs. More specifically, the system further comprises at least one additional input adapted to receive analog signals from an output of the sound card (30) and at least one additional output adapted to transmit analog signals to a receiver. The electrical circuitry couples the additional input to the additional output, and is operable to transmit analog signals from the first and second inputs to the receiver and to the input of the sound card (30). The electrical circuitry is further operable to resistively isolate the analog signals transmitted from the output of the sound card (30) from the input of the sound card (30).

27 Claims, 11 Drawing Sheets

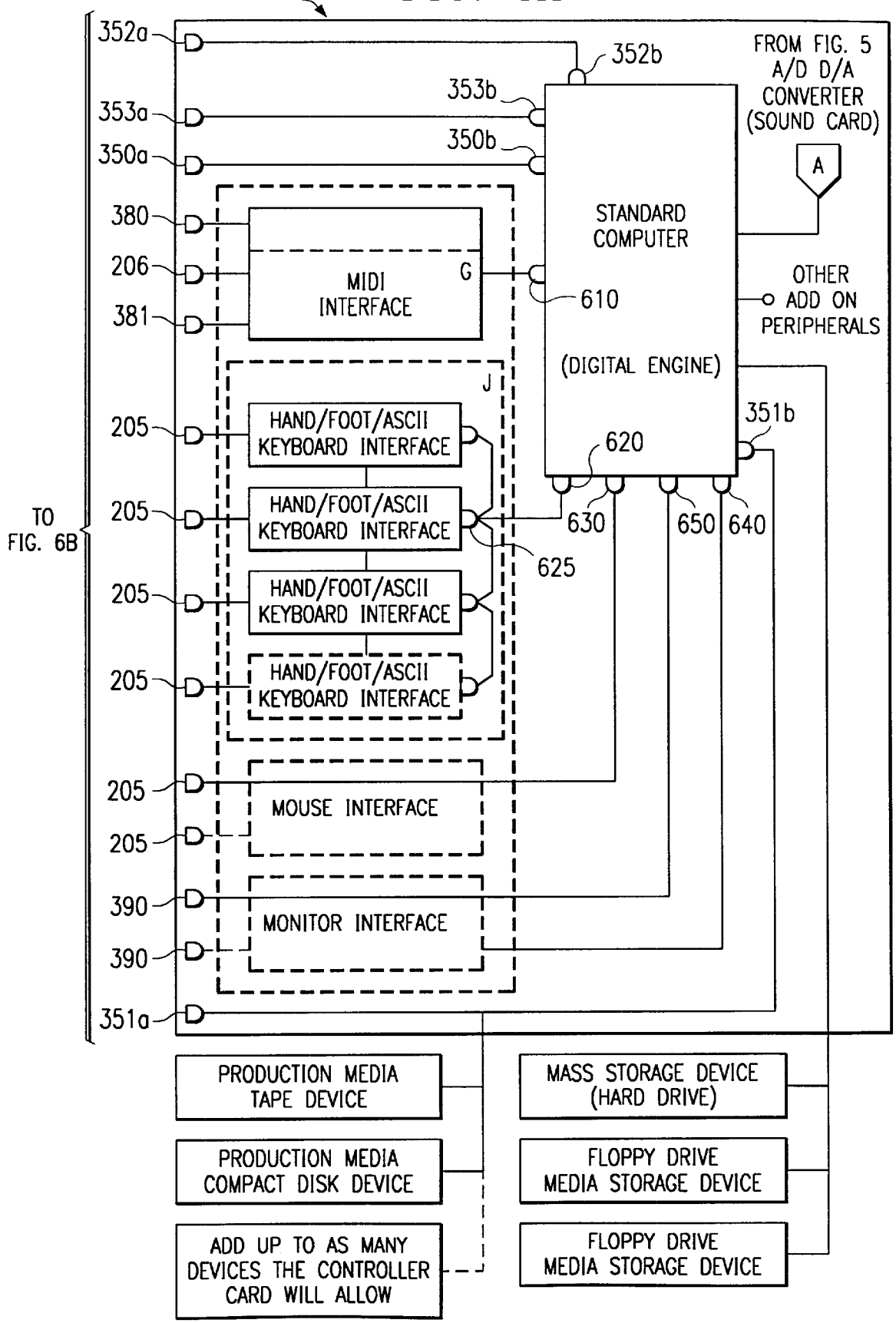

SYSTEM AND METHOD FOR AUDIO CONTROL

TECHNICAL FIELD OF THE INVENTION

This invention relates to information handling systems, specifically to a system and method for audio control.

BACKGROUND OF THE INVENTION

Information handling systems or computers are commonly used with sound cards to provide audio capability. Such sound cards are typically used in conjunction with an operating system and music application software. These sound cards have a coder/decoder or analog-to-digital and digital-to-analog conversion capability. Such a capability allows translation between the digital signals utilized by the computer and analog input or output audio signals. Computer users can thus record and enhance analog audio signals by utilizing the music application software to further process the digitized audio signals or by mixing in other digital or digitized signals. In this way, users can produce multi-media products such as music, advertisements, and sound effects for playback or for storing to mass media for distribution.

This type of computer-based sound card audio input and output system has typically suffered from a number of disadvantages. For example, these systems suffer from the disadvantage that additional adapters are required in order to use a number of components required to simultaneously proof and monitor a production of a multi-media product. For example, the use of high fidelity microphones such as XLR type low impedance microphones, line-level inputs, and MIDI inputs and outputs requires additional adapters.

One approach, described in U.S. Pat. No. 5,630,175, provided for adding audio inputs into a stereo computer system. This design requires the use of an additional sound card. Another disadvantage to this approach is that the microphones that may be used with such a system are limited to those that are low-fidelity or low quality. In an effort to overcome these disadvantages, audio mixing consoles must be used to preamplify low impedance microphone inputs or to use more than one input simultaneously. For example, in order to mix a microphone and a guitar into a recording, an audio mixing console must typically be used. Yet another disadvantage is that this approach does not provide a way to hear the playback or a way to control the music application software while away from the computer. Another disadvantage is that this approach may not effectively isolate signals from the sound card, and a user may not monitor and playback the same stereo inputs and outputs while recording, without re-recording the combined signals output from the sound card through the input of the sound card.

Therefore, a need has arisen for a system and method for audio control that overcomes the disadvantages and deficiencies of the prior art.

SUMMARY OF THE INVENTION

In accordance with the present invention, a system and method for audio control are provided which substantially eliminate or reduce the disadvantages and problems associated with prior devices used in controlling audio input and output.

The present invention comprises an adapter that provides a convenient and easy-to-use means for controlling audio input and output for recording. In accordance with one aspect of the invention an audio control system has a first input, each adapted to receive a high fidelity microphone, such as a low impedance microphone, and a second input adapted to receive a musical instrument. The system also has at least two outputs, each adapted to transmit analog signals to an input of a sound card of a computer, and electrical circuitry coupling the inputs to the outputs.

In another embodiment, the system has an additional input adapted to receive analog signals from an output of the sound card, and at least one additional output adapted to transmit analog signals to a receiver together with electrical circuitry coupling the additional input to the additional output. The electrical circuitry is operable to transmit analog signals from the first and second inputs to the receiver and to the input of the sound card, the electrical circuitry further operable to resistively isolate the analog signals transmitted from the output of the sound card from the input of the sound card.

In another embodiment, the system has a controller input adapted to receive a recording controller, and a controller output adapted to couple to the computer together with electrical circuitry coupling the controller input to the controller output.

In accordance with another aspect of the present invention, a method is disclosed for controlling audio input and output. The method includes coupling a first input adapted to receive a high fidelity microphone to a first channel of a sound card of a computer. The method then couples a second input adapted to receive a musical instrument to a second channel of the sound card. In a further embodiment, the method further comprises coupling a MIDI device to the computer.

The present invention may also permit playback while recording, while eliminating feedback of combined signals output from the sound card back to the input of the sound card, so that they are not re-recorded. Another technical advantage is a method for audio control that does not rely entirely on software controls. Another technical advantage of the present invention is a method that allows the use of high-fidelity recording equipment without the need for additional complex mixing circuitry or adapters.

A further technical advantage of the present invention is a system that allows for remote control and monitoring of a recording session. Another technical advantage of the present invention is an adapter that permits hands-free control and quick and convenient access to inputs, outputs and controls for a recording session.

BRIEF DESCRIPTION OF THE DRAWINGS

For a more complete understanding of the present invention, the objects and advantages thereof, reference is now made to the following descriptions taken in connection with the accompanying drawings in which:

FIGS. 6A and 6B illustrate a preferred embodiment for electrical circuitry that may be used to couple inputs to outputs of an audio input and output adapter.

DETAILED DESCRIPTION OF THE INVENTION

The present invention and its advantages are best understood by referring to FIGS. 1–7B of the drawings, like numerals being used for like and corresponding parts of the various drawings.

Figure 1:
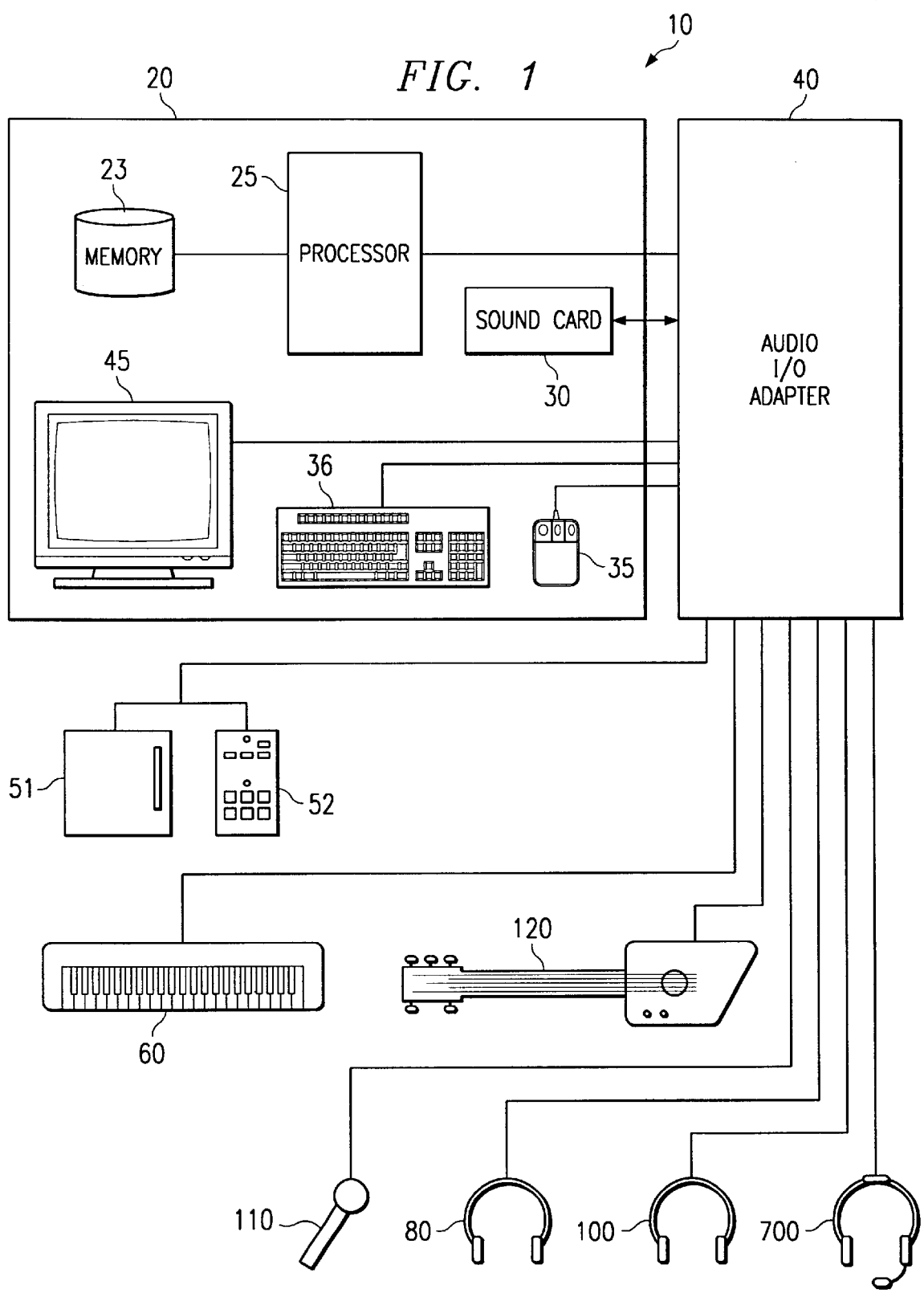
FIG. 1 is a block diagram of an audio control system of the present invention.

FIG. 1 is a block diagram of an audio control system of the present invention. Audio control system 10 comprises a standard computer 20 coupled to audio input and output (I/O) adapter 40. Various audio input devices such as a high-fidelity, low impedance microphone 110, high-fidelity, high impedance device 120 such as a microphone, phonograph input, or musical instrument for example a guitar, and Musical Instrument Digital Interface (MIDI) piano keyboard 60 are coupled to computer 20 through audio I/O adapter 40. Similarly, audio out devices, such as stereo headphones 80,100 are also coupled to computer 20 through audio I/O adapter 40. Foot controller 51 and hand controller 52 control the operation of system 10 via audio I/O adapter 40. Headset 700 may also be coupled to computer 20 through audio I/O adapter 40. Audio control system 10 allows a user to quickly and conveniently access many of these inputs, outputs, and controls at the front of computer 20 or audio I/O adapter 40. These inputs, outputs and controls are discussed below in further detail.

Computer 20 includes such typical components as standard sound card 30, processor 25, memory or disk storage 23, mouse 35, keyboard 36, and monitor 45.

Figure 2A:
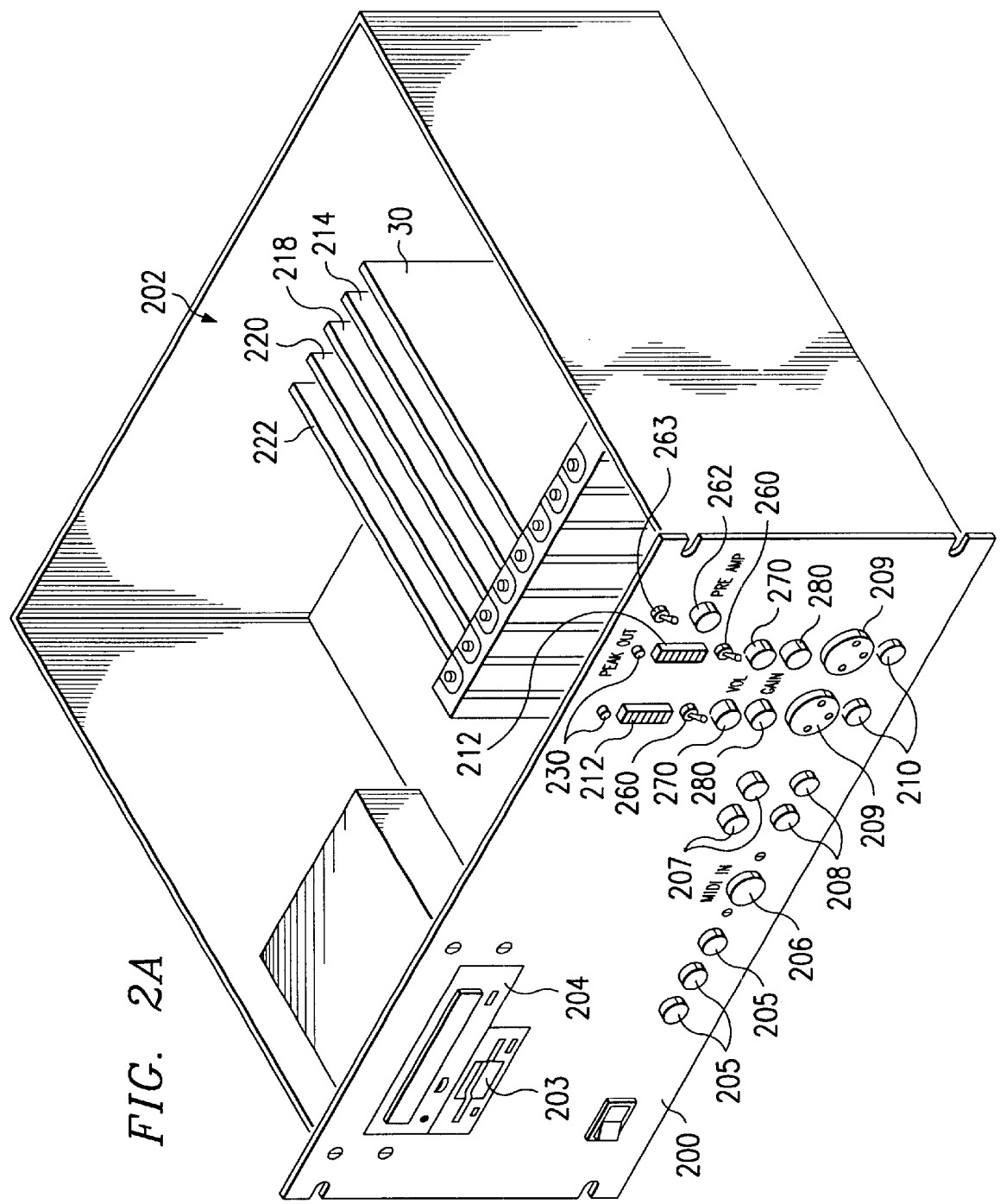
FIG. 2A is a front view of an audio control system of the present invention.
Figure 2B:
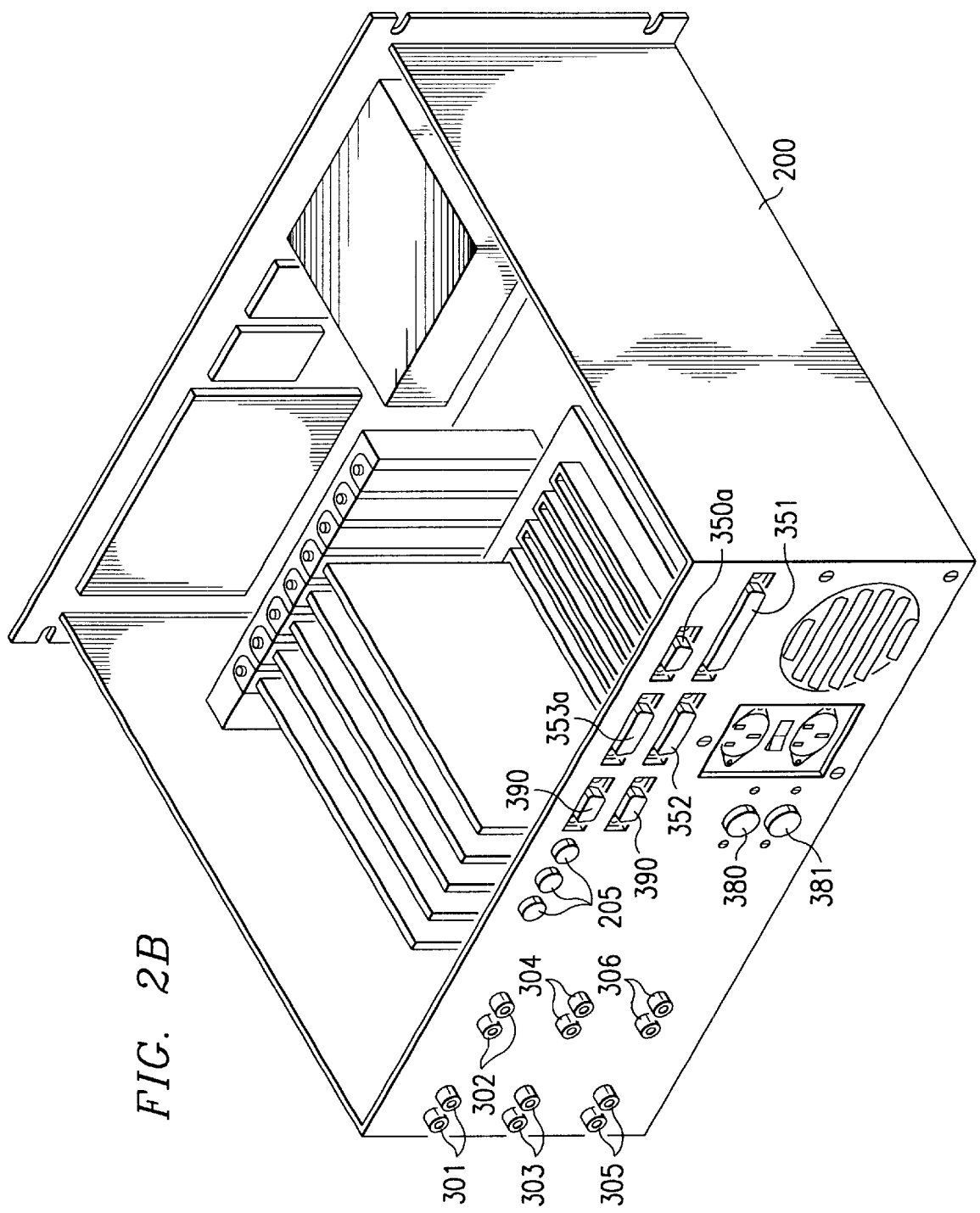
FIG. 2B a back view of an audio control system shown in FIG. 1.

Audio I/O adapter 40 is described in further detail in conjunction with FIGS. 2A and 2B. A second embodiment for audio I/O adapter 40 is described in conjunction with FIGS. 2C and 2D. Controllers such as hand controller 52 and foot controller 51 are described in further detail in conjunction with FIGS. 3 and 4. Electrical circuitry used in audio I/O adapter 40 is described in conjunction with FIGS. 5A–6B. Electrical circuitry used to couple handset 700 to audio I/O adapter is described in conjunction with FIGS. 7A and 7B.

In operation, a user can utilize audio control system 10 for recording by controlling computer 20, utilizing a compatible operating system and music application software. For example, the user may simultaneously record guitar, voice, and a MIDI input such as trumpets. The user may do so by selecting an internal soundbank or soundfont in the music application software using MIDI keyboard 60, mouse 35, or ASCII keyboard 36, while viewing monitor 45.

For example, the user may releasably couple a musical instrument such as guitar 120 and high-fidelity, XLR microphone 110 into front view of chassis 200 of audio I/O adapter 40, as shown in FIG. 2A. Audio control system 10 permits the user to hear and monitor the voice, guitar, and trumpets being recorded by means of stereo headphone 80, which is releasably coupled to audio adapter 40. In this embodiment, guitar 120 will be heard on one side (channel one) and the voice on the other (channel two). Then, for example, trumpets from MIDI keyboard 60 may be heard in both channels of headphone 80.

The user can also control recording of such audio inputs without being seated near computer 20 by using suitable controllers, such as foot controller 51 and hand controller 52. For example, to playback, undo, or edit the recording after the session is finished, either hand controller 52 or ASCII keyboard 36 may be used in conjunction with mouse 35 and monitor 45. Hand controller 52 and foot controller 51 are discussed in further detail in conjunction with FIGS. 3 and 4. The user can also perform telephone calls without being seated near computer 20 by using headset 700, which is discussed in further detail in conjunction with FIGS. 7A and 7B.

It is within the scope of the invention for audio control system 10 to permit more than one user to simultaneously record and monitor a recording session. In addition, the user may record additional instrument tracks that may later be edited into the recording. Further, other embodiments of audio control system 10 may permit simultaneous recording of multiple instruments such as guitar 120. The user may use audio control system 10 to make an audio recording that can be saved on any suitable storage media device, including, but not limited to CDs, and other suitable optical and magnetic media. Such suitable devices may be coupled to computer 20 and may include devices that are adapted to receive videos, cassettes, CDs, or other mass media storage systems. Coupling of such devices to computer 20 is discussed in further detail in conjunction with FIG. 6.

FIGS. 2A and 2B show front and back views of one embodiment of audio control system 10 of the present invention. Audio I/O adapter 40 has digital control inputs such as MIDI IN 206, audio inputs such as LO Z 209, Hi Z 210, audio outputs such as stereo headphone jacks 208, readouts 212, 230 and various control switches 207, 270 and 280, all of which are integrated into the chassis 200 of computer 20, as shown in FIGS. 2A and 2B. Computer 20 has electronic control cards 202, CD ROM drive 204, and disk drive 203. Electronic control cards 202 include motherboard 214, sound card 30, and various other application specific cards 218, 220 and 222.

It is also within the scope of the invention for audio control system 10 to comprise an audio I/O adapter 40 which is not integrated with computer 20. Audio I/O adapter 40 as shown in FIG. 1 also comprises a plurality of inputs and outputs adapted to transmit signals to and from computer 20 (not explicitly shown), and electrical circuitry coupling the inputs to the outputs (not explicitly shown). Such inputs and outputs and circuitry are discussed in conjunction with FIGS. 5A–6B.

FIG. 2A is a front view of audio control system 10 of the present invention. Computer 20 typically includes data control inputs 205 for releasably coupling to mouse 35 and keyboard 36. Additional devices such as hand controller 52 and foot controller 51 can also releasably couple to input 205. Headset 700 may also releasably couple to an input 701(not explicitly shown), as discussed in conjunction with FIGS. 7A and 7B. The user may use CD ROM drive 204 and/or disk drive 203 for reading or writing to and from audio control system 10.

In this embodiment, audio adapter 40 comprises a plurality of inputs, outputs and readouts for a first and a second stereo channel of audio I/O adapter 40, channels one and two. Each of the inputs 206, 209, and 210 comprises a receptacle adapted to releasably couple to a suitable analog or digital audio input device. Such receptacles are known to those skilled in the art. For example, digital input 206 may releasably couple to MIDI piano keyboard 60, and inputs 209 may releasably receive high-fidelity, balanced and non balanced low impedance microphones 110 for channels one and two. One such microphone 110 may be an XLR type.

Similarly, audio input 210 may releasably receive high-fidelity, balanced and non balanced high impedance microphones, as well as musical instruments such as guitar 120 for channels one and two. Audio input 210 desirably provides a wide range of gain control to accommodate such input devices. In this embodiment, inputs 210 are standard one-quarter inch phone jacks that may releasably receive suitable devices for providing high quality audio inputs.

Audio receivers such as for example, stereo speakers or headphones 80 and 100 can releasably couple to audio outputs 208. Outputs 208 may be any suitable receptacles, such as standard stereo headphone jacks for providing two-channel playback capability. The user may control the volume of audio playback into headphones 80 and 100 by any suitable control switch., such as rotatable knobs 207.

In this embodiment, separate and identical readouts 212 provided for monitoring and controlling desired gain and volume in channels one and channel two. Thus, knobs 270 and 280 control the audio input volume and gain, respectively.

One embodiment for readouts 212 is a standard volume unit (VU) decibel meter. Such meters enable the user to visually verify and control desirable volume and gain for a channel. Readout displays can be graphically changed by switch 263, audio overload or clipping is verified by indicators 230, and may be reset by button 262. Any suitable readout 212 such as a VU meter may be used for its ease and accessibility. Such readouts do not take up display space on monitor 45, and are not as sluggish to respond as software-controlled meters. Such readouts can be controlled by a number of suitable mechanical or electrical control switches, knobs, buttons, or levers.

The user may also select between line-level inputs 209, 210, and 305, and preamplified inputs for channels one and two, by utilizing selector switches 260. Such inputs are discussed in further detail in conjunction with FIG. 2B.

FIG. 2B is a back view of audio control system 10 of the present invention. Audio control system 10 includes audio inputs and outputs, in addition to typical communication ports and elements found in computer 20.

In this embodiment, separate and identical audio inputs and outputs are provided for channels one and channel two. Each of the audio inputs and outputs 301–306, 381, 380 comprises a receptacle adapted to releasably couple to a suitable digital audio control input or output device. Such receptacles are known to those skilled in the art. For example, input/outputs 380 and 381 provide two-way MIDI communications to audio control system 10.

Audio inputs 301, 305 are adapted to releasably receive suitable line-level audio inputs that are typically used for signals that need not be processed or amplified for gain or volume adjustment. Similarly, inputs 303 provide the user the capability to receive audio input from an external sound card (not explicitly shown). Similarly, outputs 302, 304, and 306 releasably couple to suitable line-level audio outputs. Outputs 302 may releasably couple to line-level combined audio output signals, which are summed and may be subject to minimal cross-talk noise in pre mix stages, so that the user may monitor them, for example, with stereo headphones 80. In this embodiment, all of these inputs and outputs are standard phono jacks.

It is within the scope of the invention to include additional inputs and outputs 390, 205 to provide for additional monitors 45, mouse 35, keyboards 36, hand controllers 52 and foot controllers 51. Such additional devices facilitate ease of recording and control of music application software at a separate location from computer 20. It is also within the scope of the invention for audio I/O adapter 40 to include suitable inputs and outputs that are compatible with wireless technology. For example, one embodiment for audio I/O adapter 40 may include an infrared detector to permit wireless coupling of a suitably-adapted wireless mouse 35 to audio I/O adapter 40.

A plurality of communication input/outputs provides releasable coupling for suitable standard input and output communication devices to audio I/O adapter 40. For example, audio I/O adapter 40 supports a parallel printer at port 352a, a SCSI input/output bus at port 351a, and serial communications at ports 350a and 353a. Ports 350a and 353a utilize universal and asynchronous receiver/transmitter (UART) circuitry. At least two monitors 45 may be releasably coupled to video input/outputs 390.

Figure 2D:
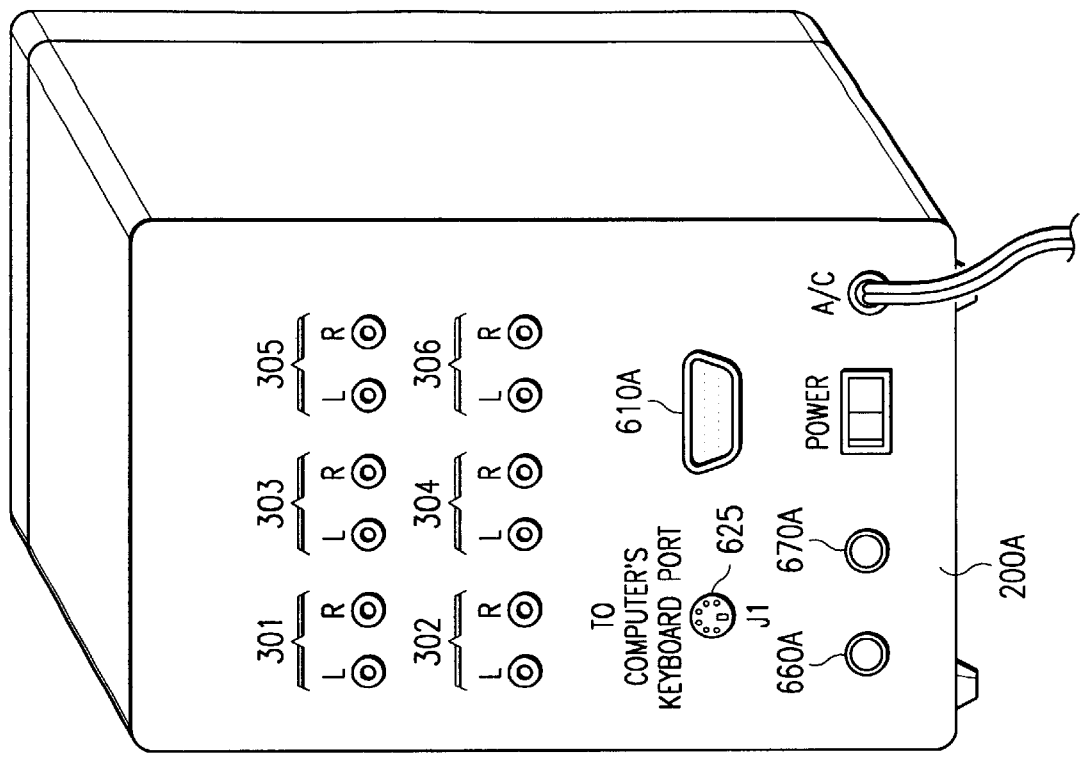
FIGS. 2C and 2D illustrate another embodiment of an audio control system using the teachings of the present invention.
Figure 2C:
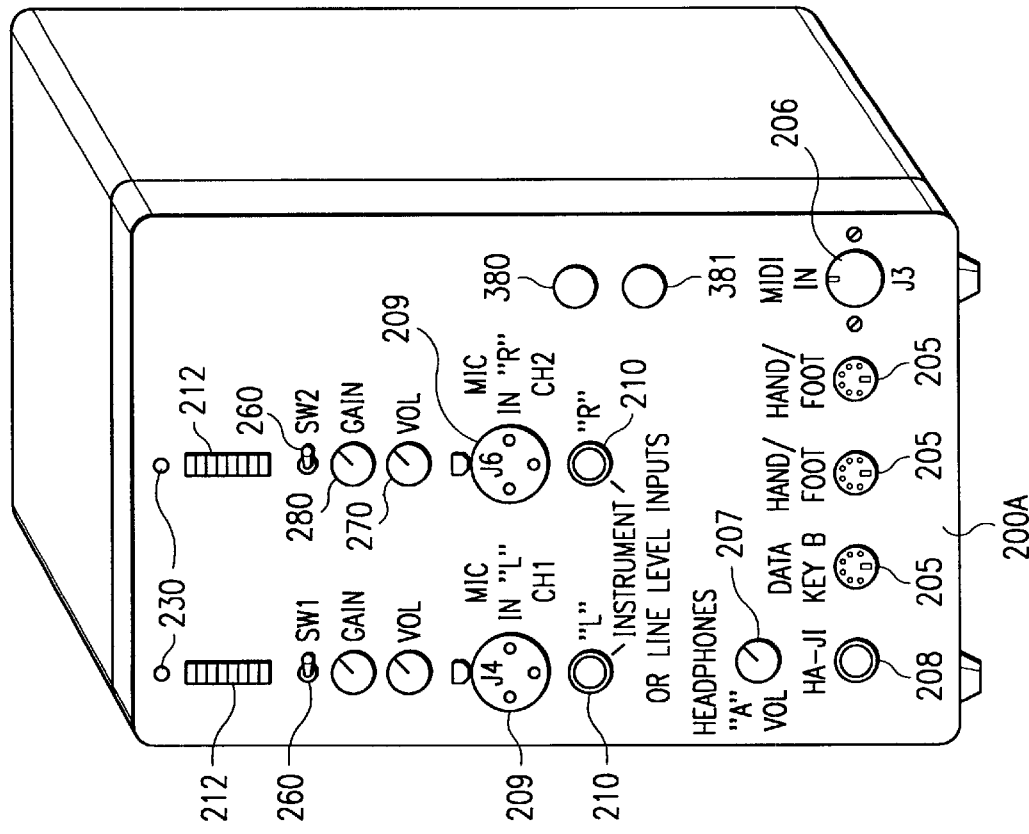

FIGS. 2C and 2D illustrate front and back views, respectively, for another embodiment of audio I/O adapter 40. Similar to the embodiments shown in FIGS. 2A and 2B, this embodiment of audio I/O adapter 40 includes audio inputs such as LO Z 209, Hi Z 210, audio outputs such as stereo headphone jacks 208, readouts 212 and various control switches 260–280, all of which are integrated into a chassis 200A.

Audio I/O adapter 40 may releasably couple to sound card 30 of computer 20 (not explicitly shown) at stereo receptacles 660A and 670A. Inputs and outputs 660 and 670 to sound card 30 are further discussed in conjunction with FIG. 5A. Audio I/O adapter 40 may also releasably couple to input/output 610 of computer 20 at receptacle 610A for MIDI input and output. MIDI interface circuitry is further discussed in conjunction with FIG. 6A. Computer 20 has electronic control cards 202 which include motherboard 214, sound card 30, and various other application specific cards 218, 220 and 222.

This embodiment may comprise a subset of the inputs and outputs that were discussed in conjunction with FIGS. 2A and 2B. In this embodiment, a user may utilize audio inputs 209–210 and similarly monitor recording of audio signals by utilizing readouts 212, 230 and controls 260–280. One stereo headphone 80, which releasably couple to output 208, may be controlled by knob 207. Inputs and outputs 301–306 are standard phono jacks and operate as discussed in FIG. 2B.

Similarly, inputs 205 support a plurality of mouse 35, keyboards 36, foot controllers 51 and hand controllers 52. It is also within the scope of this embodiment to include suitable inputs and outputs that are compatible with wireless technology.

In the embodiments as shown in FIGS. 2A–2D, audio I/O adapter 40 may be enclosed by any suitable chassis 200 or 200A, such as those used in the manufacture of typical computers, of sufficient size for a plurality of audio inputs, outputs and controls. It is within the scope of the invention for audio I/O adapter 40 to comprise as few or as many inputs, outputs, and peripherals such as mass storage devices and monitors as are needed to support a user's needs. As another example, audio I/O adapter 40 may also be used with a laptop computer 20.

Figure 3:
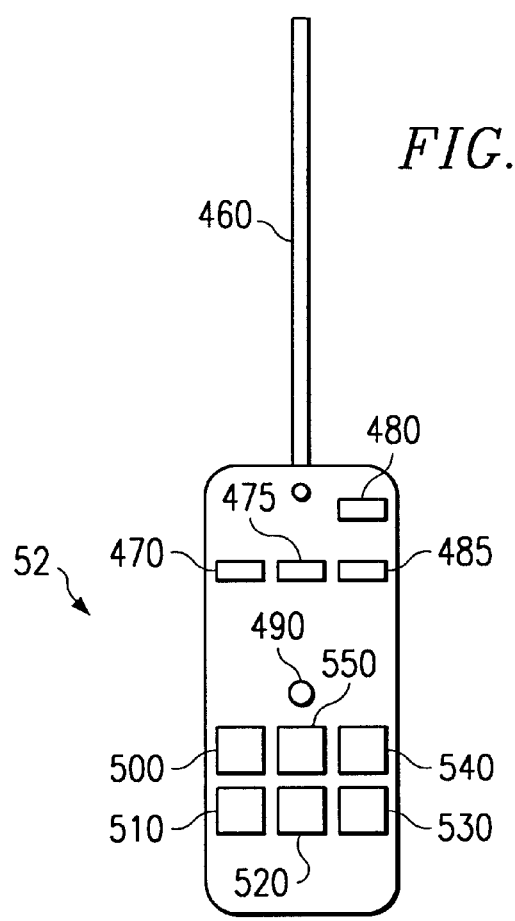
FIG. 3 illustrates one embodiment for a hand controller that may be used in the embodiment in FIG. 1.

FIG. 3 illustrates one embodiment for a controller such as hand controller 52 as shown in the embodiment in FIG. 1. In this embodiment, hand controller 52 is generally rectangularly-shaped and includes a plurality of controls and buttons. Such controls and buttons may be hard-wired or programmable, and allow the user to control audio control system 10 while making a recording without the need to be located near computer 20. Such a controller facilitates recording while using audio input and adapter 40, especially for persons who may be disabled or who are recording a solo session. The user may utilize hand controller 52 to playback or undo a recording, or edit unwanted pops or noises. In conjunction with this process, the user may also utilize monitor 45 and software in computer system 20.

Hand controller 52 may be releasably coupled to audio I/O adapter 40 at receptacle 205 by means of data control cord 460. In this embodiment, hand controller 52 includes six keys or switches 500 through 550. These six switches may be assigned standard recording functions to control application software used in audio control system 10. Switches 500 through 550 permit the user to perform standard recording functions such as rewind, record, stop, pause, fast forward, and play. Switches 500 through 550 may be any standard mechanical or capacitive type switches.

Hand controller 52 may also include a plurality of user-assigned, software programmable keys. In this embodiment, switches 470 through 490 are such user assigned, software programmable keys. These keys may be assignable to perform short cuts, macros, or any other software function that the user may typically utilize in operating application software in audio control system 10. Similarly to buttons 500 through 550, keys 470 through 490 may be any standard mechanical or capacitive type switches.

It is also within the scope of the invention for hand controller 52 to be electrically coupled to audio I/O adapter 40 by means of any suitable wireless circuitry. Hand controller 52 may also be voice controlled. Hand controller 52 may be any shape, and suitably large to accommodate any number of desired switches and controls.

Figure 4:
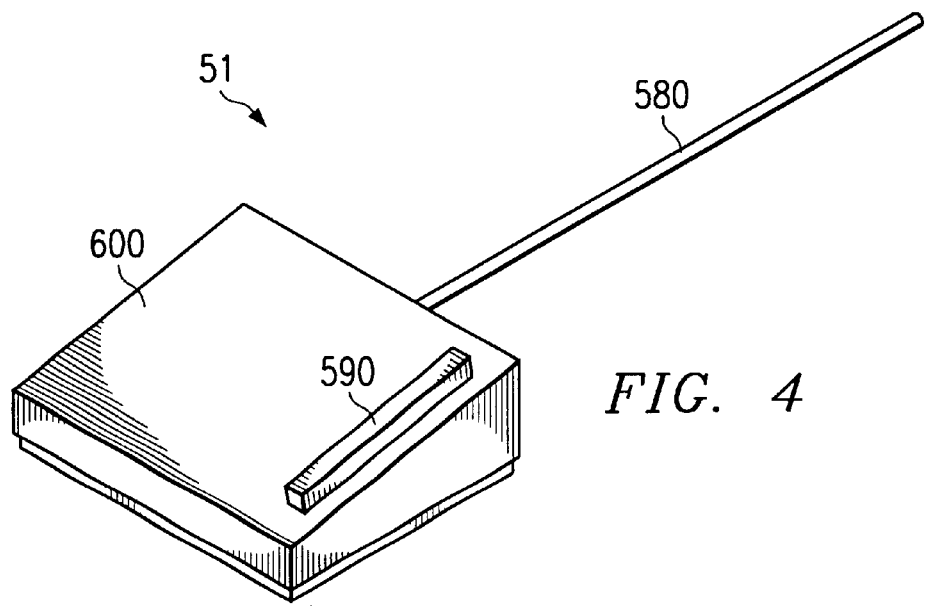
FIG. 4 illustrates one embodiment for a foot controller that may be used in the embodiment in FIG. 1.

FIG. 4 illustrates one embodiment for a controller such as foot controller 51 as shown in the embodiment in FIG. 1. Foot controller 51 enables a user to perform basic recording functions without the need to directly access or be seated next to mouse 35, keyboard 36, or monitor 45 of audio control system 10. Use of foot controller 51 also frees up the user's hands to perform other tasks while recording. Foot controller 51 may be releasably coupled to audio I/O adapter 40 at input 205 by means of data control cord 580.

In this embodiment, foot controller 51 comprises depressible foot pedal 600, depressible switch 590, and data control cord 580. Foot controller 51 is generally rectangularly-shaped. In this embodiment, depressible switch 590 corresponds to a software assigned value for record. Thus, when a user depresses switch 590, data is transferred through data control cord 580 to instruct application software used in computer system 20 to record audio inputs once switch 590 is depressed. Similarly, when a user is done recording, the user may depress foot pedal 600. Depressing foot pedal 600 sends data through data control cord 580 to instruct sound recording software and computer system 20 to play back a desired track.

It is also within the scope of the invention for foot controller 51 to be electrically coupled to audio I/O adapter 40 by means of any suitable wireless circuitry. Foot controller 51 may also be voice controlled. Foot controller 51 may be any shape, and suitably large to accommodate any number of desired controls such as buttons.

FIGS. 5A–6A illustrate preferred embodiments for electrical circuitry that may be used in audio I/O adapter 40 to couple inputs and outputs as discussed in conjunction with FIGS. 1–2D. In this embodiment, such electrical circuitry comprises input selection circuitry A, volume monitoring circuitry B, output circuitry C, MIDI interface circuitry G and peripheral interface circuitry J. Input selection circuitry A, volume monitoring circuitry B and output circuitry C are discussed in conjunction with FIGS. 5A and 5B. MIDI interface circuitry G and peripheral interface circuitry J are discussed in conjunction with FIGS. 6A and 6B. FIG. 6B illustrates typical devices that may releasably couple to the circuitry discussed in FIG. 6A.

Figure 5A:
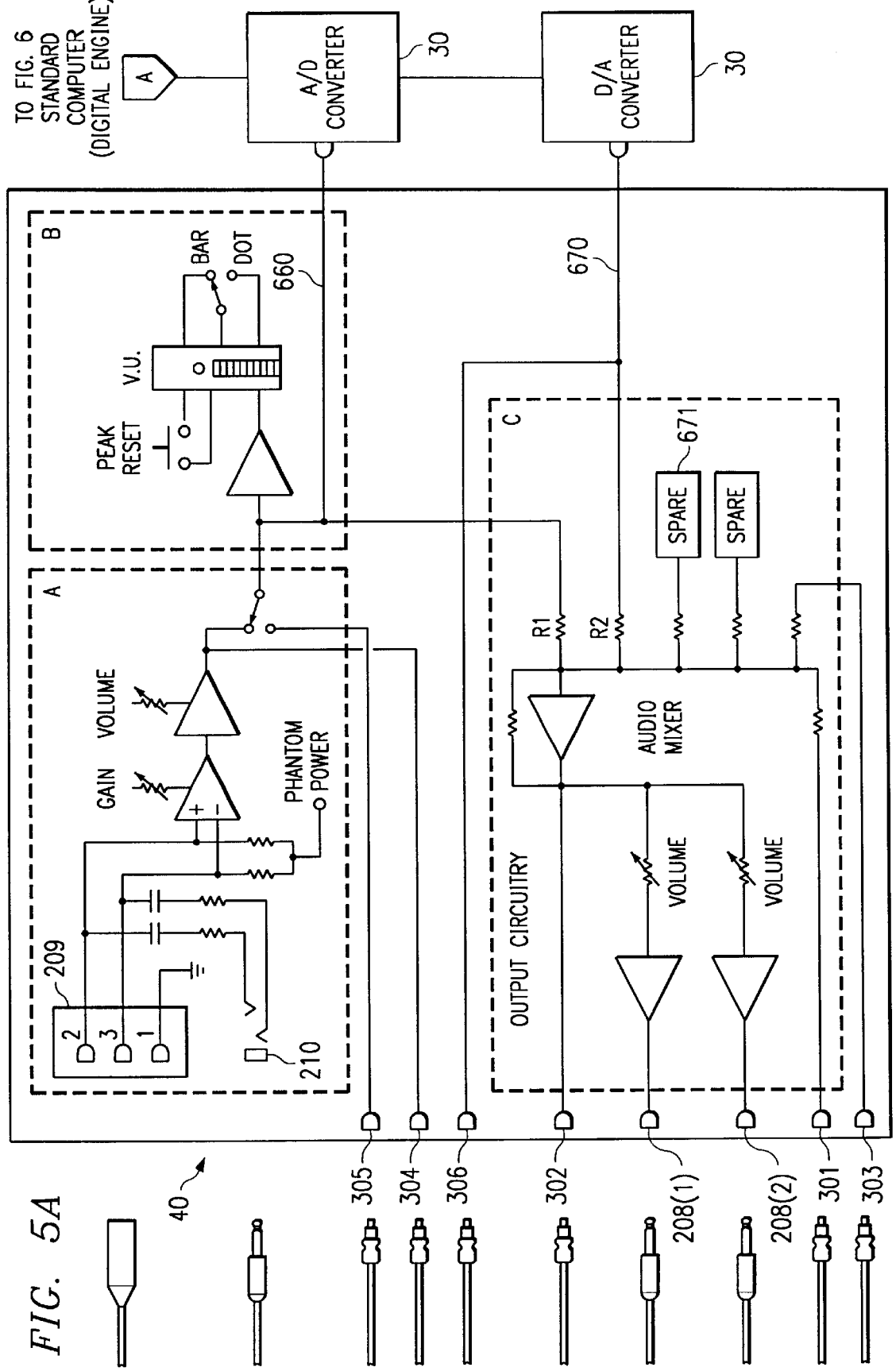
FIG. 5A illustrates a preferred embodiment for electrical circuitry that may be used to couple inputs to outputs for channel one of an audio input and output adapter.

FIG. 5A illustrates exemplary coupling of inputs to outputs. for channel one in audio I/O adapter 40 by input selection circuitry A, volume monitoring circuitry B, and output circuitry C. In this embodiment, inputs and outputs for channel two would be coupled by separate and identical circuitry A, B, and C. Other embodiments may couple electrical circuitry for channel one to channel two. Although direct connections are illustrated for various elements, many elements may be coupled through other elements without departing from the scope of the invention.

Input selection circuitry A is coupled to a plurality of receptacles and to volume monitoring circuitry B. Input selection circuitry A processes audio signals received at inputs 209, 210, and 305 from user-selected input devices, such as high-fidelity, low impedance microphone 110, high-fidelity, high impedance microphone or guitar 120, and a line-level audio device.

Input selection circuitry A processes input audio signals from either microphone 110 or instrument 120. Input selection circuitry A isolates inputs 209 and 210 by means of capacitive and resistive coupling, and couples the receptacles to user-controllable gain and volume pre-amplification circuitry. The user may utilize such gain and volume pre-amplification circuitry to adjust the gain and volume of the audio signal input to inputs 209 and 210 by using devices such as knobs 270 and 280, as discussed in conjunction with FIG. 2A. The audio signal passes through the pre-amplification circuitry, to volume monitoring circuitry B. The audio signal may also pass to output 304 for the user to monitor or for external signal effects processing.

Input selection circuitry A is also operable to select and process input audio signals from input 305 by a variety of methods known to those skilled in the art, such as switch 260. Input 305 is adapted to receive a line-level audio input signal, which directly couples to volume monitoring circuitry B.

In this embodiment, volume monitoring circuitry B comprises an amplifier and circuitry associated with readouts 212, 230 and associated controls, such as a VU meter, indicators 212, 230, button 262, and switch 263.

Volume monitoring circuitry B couples inputs 209, 210, and 305 to output 660 and to output circuitry C. Volume monitoring circuitry B may be any suitable circuitry that permits the user to monitor readouts of the audio inputs such as volume and gain. Output 660 is adapted to releasably couple to the analog input of channel one of sound card 30 for analog to digital conversion, and for further processing in computer 20.

Output circuitry C comprises audio mixing circuitry and volume amplification circuitry. Output circuitry C is coupled to sound card 30 output 670, which is adapted to releasably couple to the output for channel one of sound card 30. Output circuitry C also couples outputs 660, 670 and volume monitoring circuitry B to outputs 208, 302, and 306. Such coupling permits the user to virtually simultaneously listen to an audio signal as it is processed from inputs 209 and 210, 305 through input. selection circuitry A and volume monitoring circuitry B, inputs 301, 303, 305, and 671, and sound card 30 output 670. The user may listen to the audio signal using any suitable amplifier, such as stereo headphones 80 and 100, which comprise two-channel coupling for stereo sound. Output circuitry C also directly couples output 670 from the output of channel one of sound card 30 for suitable line 10 level output 306. Such an output is typically a standard RCA plug, requires no volume monitoring, and is discussed in conjunction with FIG. 2B.

Audio mixing circuitry permits selection and amplification of signals received from volume monitoring circuitry B and from signals received from sound card 30. The audio mixing circuitry couples such inputs through output circuitry C to outputs 302, 208, and 306. Signals are directly coupled from audio mixing circuitry to any suitable line-level output or amplified by volume amplification circuitry. Such circuitry obviates the need for an additional complex mixing console, and resistively isolates signals received from sound card 30 from the input of sound card 30. In this embodiment, a suitably-sized resistor R2 attenuates analog signals transmitted from sound card 30 as they are transmitted to outputs 208, 302. A second suitable resistor R1 further resistively isolates such analog signals from the input of sound card 30 by attenuating such analog signals and thus prevents them from being re-recorded at the input of sound card 30. Similarly, R2 attenuates signals transmitted from volume monitoring circuitry B and resistively isolates them from the output of sound card 30.

Output circuitry C may also be configured to process additional signals. For example, outputs from one channel of additional sound cards (not explicitly shown) may also be processed through audio mixing circuitry at one or more inputs 671. Further, signals may similarly be directly output to input/output 306 and directly input to input 305 for releasable coupling to such an external sound card. Additional inputs such as inputs 209, 210 and 305 may also be coupled through additional or similar input selection circuitry A and volume monitoring circuitry B to additional inputs 671 in output circuitry C, and to sound card input 660. Some or all of these inputs may be, for example, summed or multiplexed as desired to sound card 30, and are only limited by the capacity of sound card 30. Alternatively, some or all of these inputs may also each be coupled to an additional sound card (not explicitly shown). For each additional input channel processed using additional input selection circuitry A and volume monitoring circuitry B, an additional output channel may also be utilized. For example, each such additional output channel may be coupled to output 670 of sound card 30, or to an output of the additional sound card that corresponds to an additional input channel. In such embodiments, additional resistors R1 and R2 may also resistively isolate signals from sound card 30, or an additional sound card, as previously discussed. These embodiments may provide additional flexibility in accessing sound card banks and to create custom sound banks using standard, inexpensive sound cards.

Figure 5B:
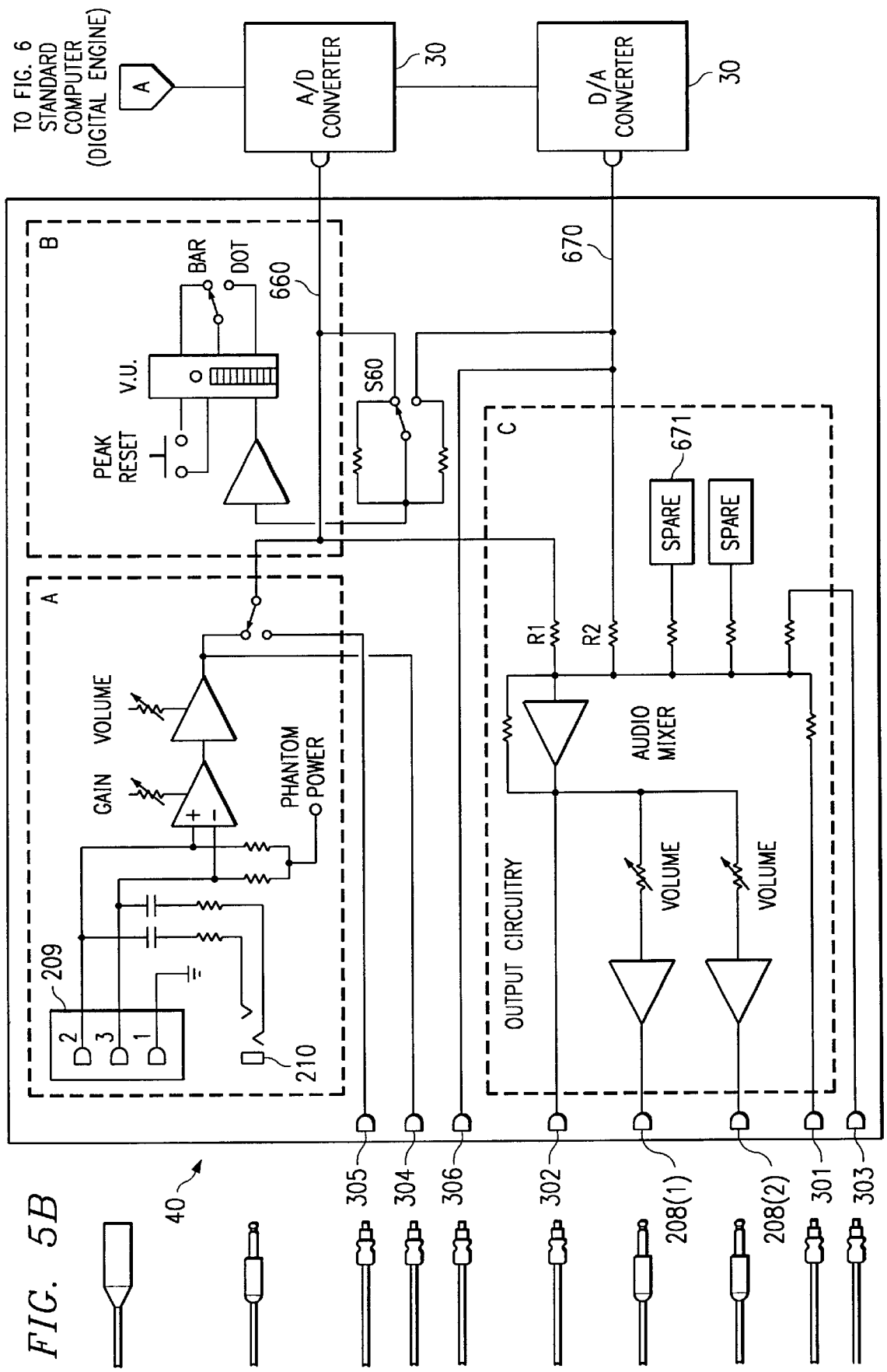
FIG. 5B illustrates another embodiment for electrical circuitry that may be used to couple inputs to outputs for channel one of an audio input and output adapter.

FIGURE 5B illustrates another embodiment for electrical circuitry that may be used to couple inputs to outputs for channel one of an audio input and output adapter. In this embodiment, audio I/O adapter 40 comprises circuitry in addition to the elements described in FIG. 5A.

For example, in some embodiments of the invention, switch S60 may be coupled between the input 660 and output 670 of sound card 30, and volume monitoring circuitry B. Such a configuration allows the user to monitor both sound card 30 inputs and outputs by using volume monitoring circuitry B.

It is also within the scope of the invention to couple and isolate input 660 and output 670 of sound card 30 by suitable means such as resistors as an alternative to or in addition to switch S60. Such a suitable configuration may allow the user to sum and simultaneously monitor all the signals being processed within audio I/O adapter 40. Other suitable isolation methods and circuitry may also be used.

Figure 6B:
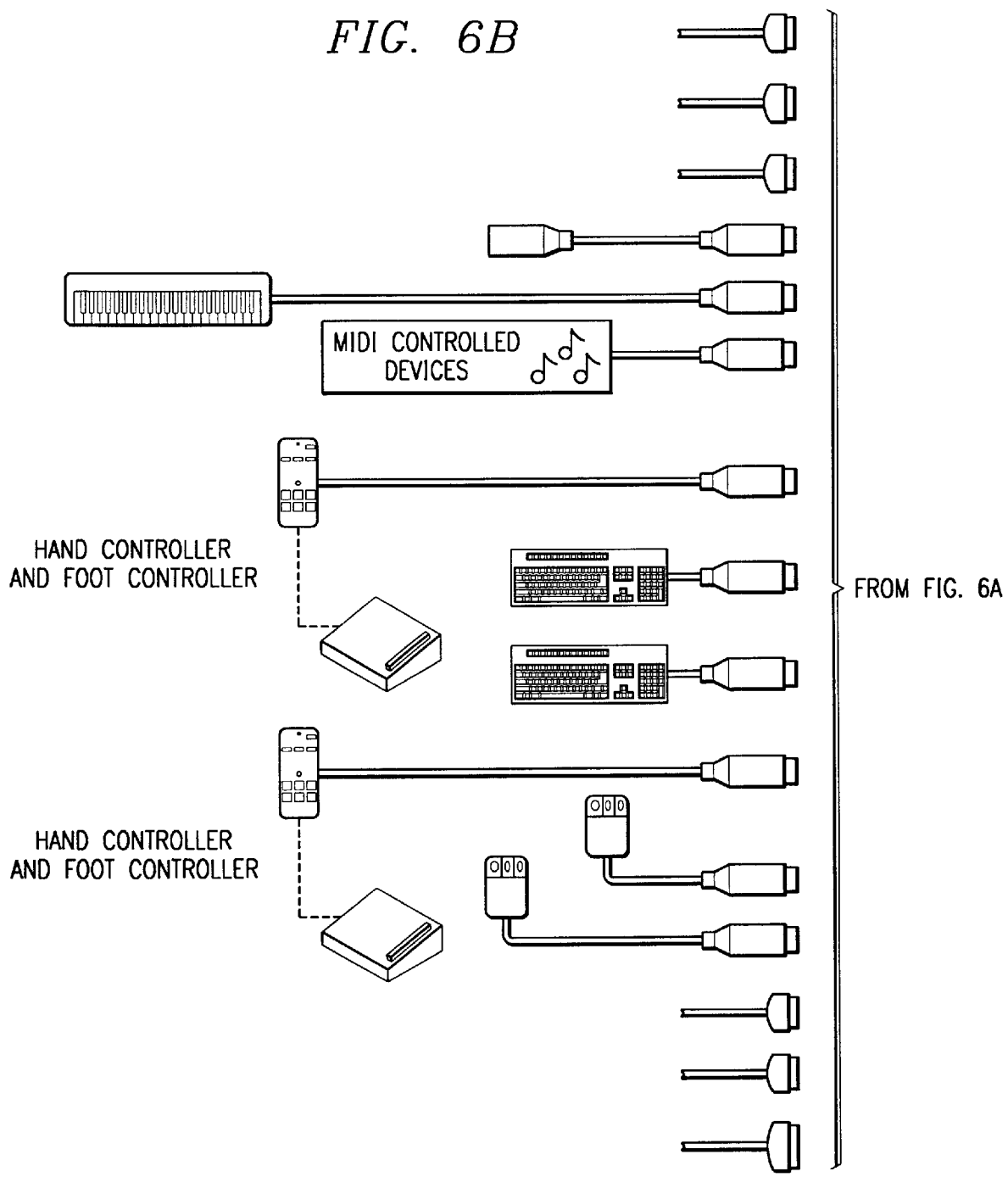

FIGS. 6A and 6B illustrate a preferred embodiment for electrical circuitry coupling additional inputs and outputs of audio I/O adapter 40. Such electrical circuitry comprises MIDI interface G circuitry and peripheral interface circuitry J, and couples the remaining inputs of audio I/O adapter 40 to the remaining outputs. MIDI interface circuitry G couples input/output 610 to input 206, which is adapted to receive MIDI devices such as piano keyboard 60. Peripheral interface circuitry J couples to output 625 inputs 205, which are adapted to receive additional keyboards 36, and hand and foot controllers 52 and 51. Such devices are illustrated by example in FIG. 6B.

MIDI interface circuitry G is also operable to couple input/output 610 to a plurality of suitable MIDI devices via input/outputs 206, 380 and 381. Such coupling permits additional access to other MIDI and MIDI controlled devices. It is also within the scope of the invention for MIDI interface circuitry G to support direct MIDI to and from the Internet, and to couple additional suitable MIDI devices at additional input/outputs 206, 380 and 381 to input/output 610.

In this embodiment, the electrical circuitry used in audio I/O adapter 40 also directly couples a plurality of input receptacles to outputs. For example, ports 350a–353a are coupled to outputs 350b–353b, respectively. These inputs and outputs are standard I/O plugs and receptacles.

Peripheral interface circuitry J couples inputs adapted to receive peripherals, such as keyboard 36, to output 625, and further couples output 625 to computer 20 at inputs 620, 630 and 640, and output 650. For example, peripheral interface circuitry J couples to input 630 at least one input 205 a mouse 35. It is also within the scope of the invention to couple additional devices such as mouse 35 at input 205 to input 630.

Peripheral interface circuitry J couples output 625 to input 205 a keyboard 36 and a hand controller 52 and/or foot controller 51. It is within the scope of the invention for peripheral interface circuitry J to couple additional devices such as hand controller 52, foot controller 51, and keyboard 36 at additional inputs 205 to output 625. Peripheral interface circuitry J also couples a monitor 45 to inputs and outputs 640 and 650 at video input and outputs 390.

It is within the scope of the invention to couple a plurality of devices through SCSI input/output bus port 351a. Such a plurality is limited only by the processing capacity of computer 20. Such devices include, but are not limited to, devices suitable to read and/or write a variety of media, such as production-quality tape, compact disk, floppy drive media storage, and mass storage. Such expandability facilitates the use of audio adapter control system 10 to make sound recordings on a large scale, and on production-quality media. Such a configuration also envisions the use of audio control system 10 with standard media devices available to most consumers, utilizing technologies as they become available.

Furthermore, it is also within the scope of the invention to couple additional controls, peripherals, and audio and digital input and/or output channels to audio control system 10. For example, additional monitors 45, keyboards 36, mouse 35, and hand and foot controllers 52 and 51 are also within the scope of the invention. Such expansion is limited only by the underlying software and hardware.

Other types of processing and input/output may also be used, such as optical processing and optical buses. Microphone inputs such as 209 and 210 may have phantom power. Audio control system 10 may also be used to perform cancellation functions, which include, for example, removing lead vocal data from recorded stereo soundtracks. Audio control system 10 may also comprise additional controls such as parametric equalizers, tone controls, compressor or limiters, effects, and routing.

Figure 7A:
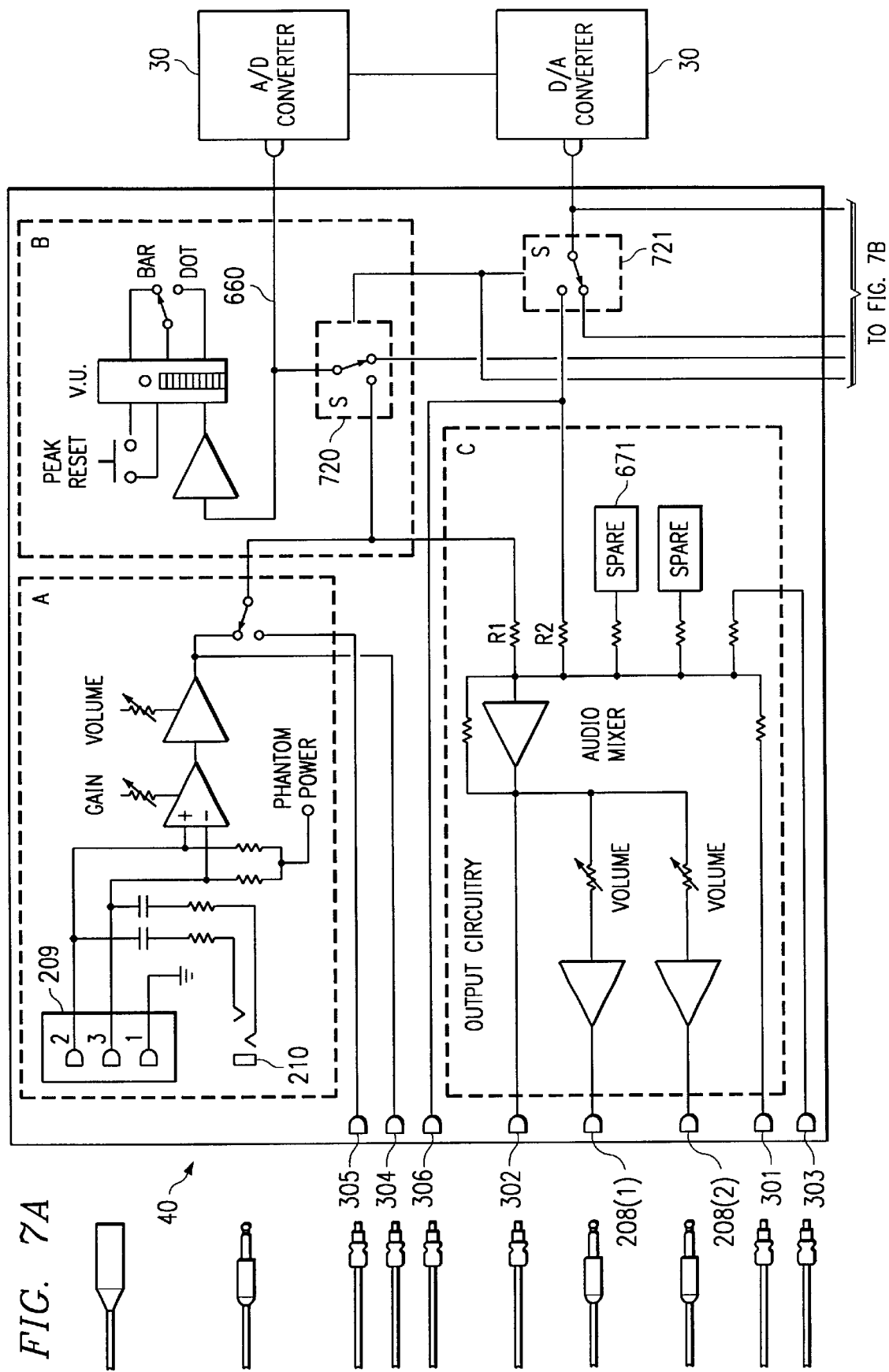
FIGS. 7A and 7B illustrate one embodiment for a headset and electrical circuitry that may be used in the embodiment in FIG. 1.
Figure 7B:
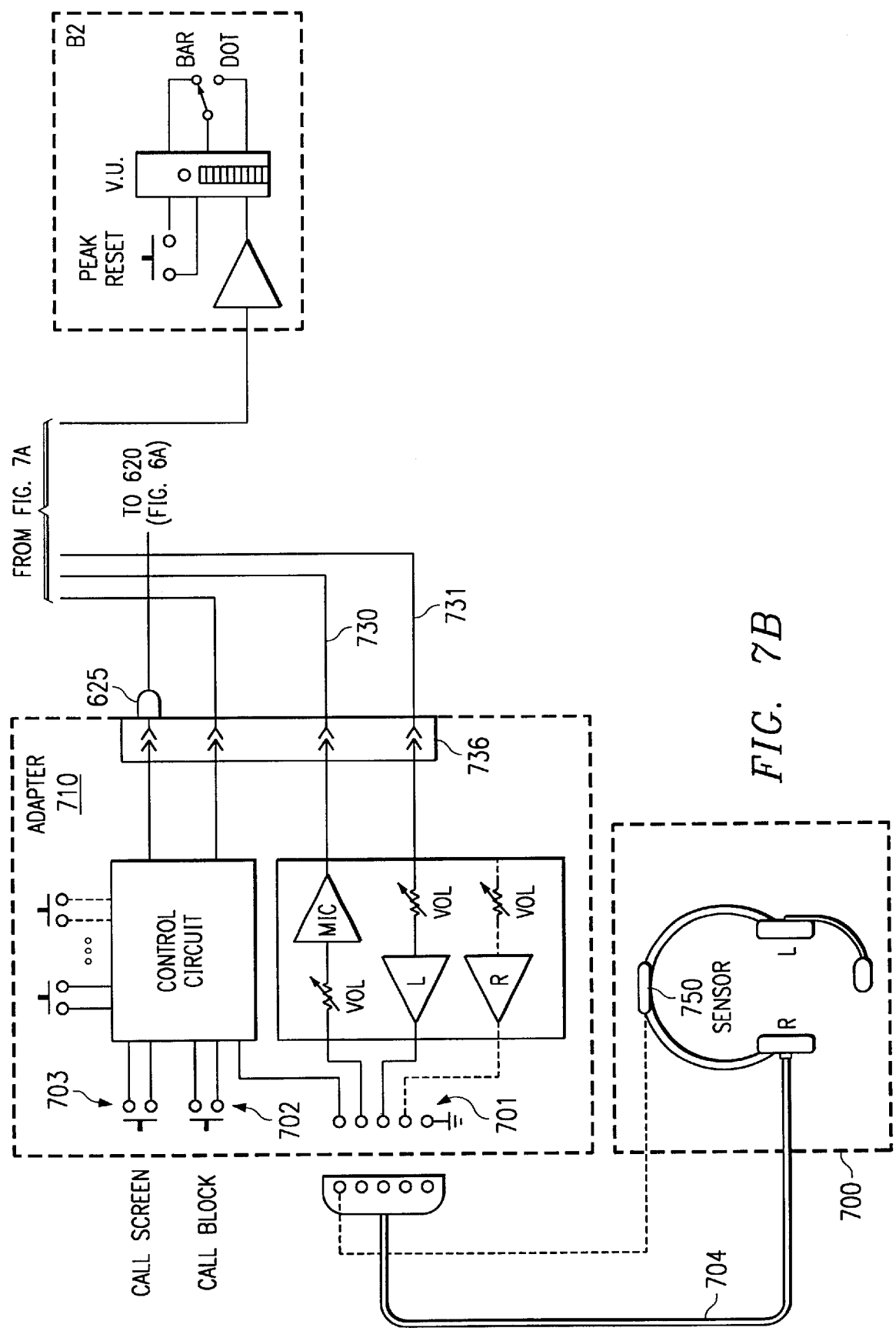

FIGS. 7A and 7B illustrate one embodiment for a headset and electrical circuitry that may be used in the embodiment in FIG. 1. Headset 700 enables a user to communicate using voice communication such as answering a telephone call, without the need to directly access or be seated next to mouse 35, keyboard 36, or monitor 45 of audio control system 10, and frees up the user's hands to perform other tasks.

In this embodiment, audio I/O adapter 40 comprises adapter 710, volume monitoring circuitry B2, and switches 720 and 721, in addition to the elements discussed in detail in FIGS. 5A through 6A. Switch 720 couples output 730 of adapter 710 to volume monitoring circuitry B and to the analog input of channel one of sound card 30 for analog to digital conversion, and for further processing in computer 20. Similarly, switch 721 couples the output of channel one of sound card 30 to volume monitoring circuitry B2 and to input 731 of adapter 710 to process incoming caller signals. As illustrated in FIGS. 7A and 7B, switches 720 and 721 are set to communicate with stereo headset 700.

Adapter 710 comprises at least one standard audio input 701 to releasably couple to a suitable analog audio input device such as a suitable multi-pin jack. Adapter 710 may also comprise one or more additional controls such as buttons or switches 702 and 703, to provide suitable or user-programmable functions such as call screening or blocking. It is also within the scope of the invention for adapter 710 to comprise a standard hook and cradle device (not explicitly shown) device to connect to a standard telephone receiver, in addition to or as an alternative to headset 700. Adapter 710 comprises suitable volume amplification circuitry to process audio signals to and from sound card 30 at output 730 and input 731, respectively. Adapter 710 also comprises suitable logic coupled to switches 720 and 721 and to output 625, which may in some embodiments be coupled to computer 20 at input 620, as illustrated in FIG. 6A. Adapter 710 may also comprise or be coupled to suitable interface circuitry 736 to process signals to and from input 731 and outputs 625 and 730.

Headset 700 may be releasably coupled to audio I/O adapter 40 at input 701 by means of a suitable data control cord 704, or may be wirelessly coupled to audio I/O adapter 40. In this embodiment, headset 700 may be any suitable device allowing voice communication, such as a headset as illustrated in FIG. 7B, or a standard telephone receiver.

In operation, headset 700 may be activated for example, to receive or place a voice call. One embodiment of the invention may include a sensor 750 coupled to adapter 710 to control switches 720 and 721. Sensor 750 may also be coupled to adapter 710 by means of control cord 704. Sensor 750 may sense a user's presence and inductively activate headset 700. Activation of headset 700 may invoke adapter 710 to mute the output of other audio and digital signals present in system 10, and may further activate computer software through output 625. Adapter 710 processes audio signals received through adapter 710 and switch 720 at output 730, and receives audio signals through switch 721 at input 731, respectively. It is also within the scope of the invention for adapter 710 to comprise suitable logic to redirect signals of other devices to headset 700, or to make all inputs and outputs simultaneously active. Such logic may be implemented in software, firmware, or hardware, and may be, for example, manually controlled, to predefine or select redirection to headset 700 of any number of additional controls, inputs and outputs.

It is also within the scope of the invention for volume monitoring circuitry B2 and switches 720 and 721 to reside in adapter 710, in addition to or rather than in audio I/O adapter 40. In such an embodiment, adapter 710 may releasably couple to audio I/O adapter 40. Similarly, the elements comprising adapter 710 may be incorporated into audio I/O adapter 40. For example, the embodiments as illustrated in FIGS. 2C and 2D may incorporate input 701 and switches 702, 703, to couple to and control headset 700. Similarly, volume monitoring circuitry B2, switches 720 and 721 and the circuitry residing in adapter 710 may also be suitably incorporated into the circuitry as illustrated and discussed in FIG. 5A.

While the invention has been particularly shown and described by the foregoing detailed description, it will be understood by those skilled in the art that various other changes in form and detail may be made without departing from the spirit and scope of the invention.

What is claimed is:

1. An audio control system, comprising:
   a. a first input adapted to receive a high-fidelity microphone;
   b. a second input adapted to receive a musical instrument;
   c. at least two outputs, each adapted to transmit analog signals from the microphone and the musical instrument to an input of a sound card of a computer; and
   d. electrical circuitry coupling each of the first input and the second input to one of the at least two outputs, the electrical circuitry operable to provide common mode rejection for the analog signals from the microphone.

2. The system of claim 1, wherein the electrical circuitry comprises a first electrical circuit coupling one of the inputs to one of the outputs, and a second electrical circuit coupling a second of the inputs to a second of the outputs.

3. The system of claim 1, further comprising:
   a. at least one line-level input adapted to receive a line-level audio signal; and
   b. electrical circuitry coupling the line-level input to one of the outputs.

4. The system of claim 1 wherein one of the inputs is adapted to receive a low impedance microphone.

5. The system of claim 1 further comprising:
   a. a controller input adapted to receive a controller, the controller operable to control the computer;
   b. a controller output adapted to couple to the computer; and
   c. electrical circuitry coupling the controller input to the controller output.

6. The system of claim 1 further comprising:
   a. a MIDI input adapted to receive a MIDI device;

b. a MIDI output adapted to couple to the computer; and c. electrical circuitry coupling the MIDI input to the MIDI output.

7. A system for controlling audio input and output, comprising:

a. a computer having a sound card, a memory, a processor, a display and a keyboard; and b. an audio adapter having a first input adapted to receive a high-fidelity microphone, a second input adapted to receive a musical instrument and electrical circuitry coupling the first input to a first input channel of the sound card and the second input to a second input channel of the sound card, the electrical circuitry operable to transmit analog signals received from the microphone and the instrument to the sound card, and provide common mode rejection for the analog signals received from the microphone.

8. The system of claim 7, wherein the memory is configured as a database.

9. The system of claim 7, further comprising an editor for execution by the computer and operable to select digital signals representing audio.

10. The system of claim 7, further comprising a mass storage medium coupled to the computer.

11. The system of claim 7 further comprising a controller coupled to the computer, the controller operable to transmit control signals to the computer for controlling audio input and output.

12. The system of claim 7 further comprising a MIDI device coupled to the audio adapter.

13. A method for controlling audio input and output, comprising:

a. coupling a first input adapted to receive a high-fidelity microphone to a first channel of a sound card of a computer using electrical circuitry;

b. coupling a second input adapted to receive a musical instrument to a second channel of the sound card using the electrical circuitry; and c. wherein the electrical circuitry is operable to transmit a first analog signal received from the microphone and a second analog signal received from the musical instrument to the sound card and provide common mode rejection for the first analog signal.

14. The method of claim 13 further comprising:

a. coupling a controller to the computer; and b. controlling the computer by the controller.

15. The method of claim 13 further comprising coupling a MIDI device to the computer.

16. The method of claim 13 further comprising coupling a mass storage medium to the computer.

17. An audio control system, comprising:

a. a first input adapted to receive a microphone;

b. a second input adapted to receive a musical instrument;

c. one output adapted to transmit analog signals from the microphone and the musical instrument to an input of a sound card of a computer; and d. electrical circuitry coupling each of the first input and the second input to the output, the electrical circuitry operable to provide common mode rejection for the analog signals from at least one of the microphone and the musical instrument.

18. A method for controlling audio input and output, comprising:

a. coupling a first input adapted to receive a microphone to a first channel of a sound card of a computer using electrical circuitry;

b. coupling a second input adapted to receive a musical instrument to the first channel of the sound card using the electrical circuitry; and c. wherein the electrical circuitry is operable to transmit a first analog signal received from the microphone and a second analog signal received from the musical instrument to the sound card, and provide common mode rejection for at least one of the first and the second analog signal.

19. The system of claim 1, wherein the electrical circuitry is further operable to substantially remove at least one of the group consisting of lead musical data, lead vocal data, and ambient noise data from the analog signals using the common mode rejection.

20. The system of claim 7, wherein the electrical circuitry is further operable to substantially remove at least one of the group consisting of lead musical data, lead vocal data, and ambient noise data from the analog signals using the common mode rejection.

21. The method of claim 13, wherein the electrical circuitry is further operable to substantially remove at least one of the group consisting of lead musical data, lead vocal data, and ambient noise data from the first analog signal and the second analog signal using the common mode rejection.

22. An audio control system, comprising:

a. a first input adapted to receive a high-fidelity microphone;

b. a second input adapted to receive a musical instrument;

c. at least two outputs, each adapted to transmit analog signals from the microphone and the musical instrument to an input of a sound card of a computer;

d. electrical circuitry coupling each of the first input and the second input to one of the at least two outputs, the electrical circuitry operable to provide common mode rejection for the analog signals from the microphone.

e. at least one additional input adapted to receive analog signals transmitted from an output of the sound card;

f. at least one additional output adapted to transmit analog signals to a receiver; and g. electrical circuitry coupling the additional input to the additional output, the electrical circuitry operable to transmit the analog signals from the microphone and the musical instrument to the receiver and to the input of the sound card, the electrical circuitry further operable to resistively isolate the analog signals transmitted from the output of the sound card from the input of the sound card.

23. A system for controlling audio input and output, comprising:

a. a computer having a sound card, a memory, a processor, a display and a keyboard;

b. an audio adapter having a first input adapted to receive a high-fidelity microphone, a second input adapted to receive a musical instrument and electrical circuitry coupling the first input to a first input channel of the sound card and the second input to a second input channel of the sound card, the electrical circuitry operable to transmit analog signals received from the microphone and the instrument to the sound card, and provide common mode rejection for the analog signals received from the microphone; and c. a receiver coupled to a first output channel and a second output channel of the sound card and to the first input by audio mixing circuitry, the audio mixing circuitry operable to resistively isolate analog signals transmitted from the output channels of the sound card to the receiver from the first and second input channels of the sound card.

24. A method for controlling audio input and output, comprising:
   a. coupling a first input adapted to receive a high-fidelity microphone to a first input channel of a sound card of a computer using electrical circuitry;
   b. coupling a second input adapted to receive a musical instrument to a second input channel of the sound card using the electrical circuitry;
   c. coupling an output adapted to receive a receiver to a first and second output channel of the sound card; and
   d. wherein the electrical circuitry is operable to transmit a first analog signal received from the microphone and a second analog signal received from the musical instrument to the sound card and provide common mode rejection for the first analog signal.

25. A method for controlling audio input and output, comprising:
   a. coupling a first input adapted to receive a high-fidelity microphone to a first input channel of a sound card of a computer using electrical circuitry;
   b. coupling a second input adapted to receive a musical instrument to a second input channel of the sound card using the electrical circuitry;
   c. monitoring the first analog signal while monitoring a third analog signal transmitted from first and second output channels of the sound card, the third analog signal resistively isolated from the first and second input channels of the sound card; and
   d. wherein the electrical circuitry is operable to transmit a first analog signal received from the microphone and a second analog signal received from the musical instrument to the sound card and provide common mode rejection for the first analog signal.

26. An audio control system, comprising:
   a. a first input adapted to receive a microphone;
   b. a second input adapted to receive a musical instrument;
   c. one output adapted to transmit analog signals from the microphone and the musical instrument to an input of a sound card of a computer;
   d. electrical circuitry coupling each of the first input and the second input to the output, the electrical circuitry operable to provide common mode rejection for the analog signals from at least one of the microphone and the musical instrument;
   e. at least one additional input adapted to receive analog signals transmitted from an output of the sound card;
   f. at least one additional output adapted to transmit analog signals to a receiver; and
   g. electrical circuitry coupling the additional input to the additional output, the electrical circuitry operable to transmit the analog signals from the microphone and the musical instrument to the receiver and to the input of the sound card, the electrical circuitry further operable to resistively isolate the analog signals transmitted from the output of the sound card from the input of the sound card.

27. A method for controlling audio input and output, comprising:
   a. coupling a first input adapted to receive a microphone to a first input channel of a sound card of a computer using electrical circuitry;
   b. coupling a second input adapted to receive a musical instrument to the first input channel of the sound card using the electrical circuitry;
   c. monitoring the first and second analog signals while monitoring a third analog signal transmitted from the output channel of the sound card, the third analog signal resistively isolated from the first input channel of the sound card; and
   d. wherein the electrical circuitry is operable to transmit a first analog signal received from the microphone and a second analog signal received from the musical instrument to the sound card, and provide common mode rejection for at least one of the first and the second analog signal.

* * * * *

UNITED STATES PATENT AND TRADEMARK OFFICE
CERTIFICATE OF CORRECTION

PATENT NO.     : 6,640,257 B1
DATED          : October 28, 2003
INVENTOR(S)    : M. David MacFarlane It is certified that error appears in the above-identified patent and that said Letters Patent is hereby corrected as shown below:

<u>Title page,</u>
Please deletet item [73], Assignee.

Signed and Sealed this

Thirtieth Day of March, 2004

JON W. DUDAS
*Acting Director of the United States Patent and Trademark Office*